US008721874B2

(12) United States Patent
O'Rear et al.

(10) Patent No.: US 8,721,874 B2
(45) Date of Patent: *May 13, 2014

(54) PROCESS, METHOD, AND SYSTEM FOR REMOVING HEAVY METALS FROM FLUIDS

(75) Inventors: Dennis John O'Rear, Petaluma, CA (US); Darrell Lynn Gallup, Vancouver, WA (US); Sujin Yean, Houston, TX (US); Lyman Young, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 467 days.

This patent is subject to a terminal disclaimer.

(21) Appl. No.: 12/950,637

(22) Filed: Nov. 19, 2010

(65) Prior Publication Data

US 2012/0125818 A1   May 24, 2012

(51) Int. Cl.
   *C10G 27/00* (2006.01)

(52) U.S. Cl.
   CPC .................................... *C10G 27/00* (2013.01)
   USPC .................................................... 208/251 R

(58) Field of Classification Search
   USPC .......... 208/100, 251 R; 252/182.32; 423/210, 423/215.5
   See application file for complete search history.

(56) References Cited

U.S. PATENT DOCUMENTS

| | | | |
|---|---|---|---|
| 3,873,581 A | 3/1975 | Fitzpatrick et al. | |
| 4,028,236 A | 6/1977 | Townsend et al. | |
| 4,094,098 A | 6/1978 | Gourley | |
| 4,094,777 A | 6/1978 | Sugier et al. | |
| 4,108,769 A | 8/1978 | Krieg et al. | |
| 4,133,755 A | 1/1979 | Tarao et al. | |
| 4,151,077 A | 4/1979 | Nogueira et al. | |
| 4,167,481 A | 9/1979 | Cremers et al. | |
| 4,230,486 A | 10/1980 | Capuano et al. | |
| 4,336,237 A | 6/1982 | Kudryk et al. | |
| 4,338,288 A | 7/1982 | Rollmann | |
| 4,354,942 A | 10/1982 | Kaczur et al. | |
| 4,552,646 A | 11/1985 | Stapp | |
| 4,578,195 A | 3/1986 | Moore et al. | |
| 4,619,744 A | 10/1986 | Horton | |
| 4,678,584 A | 7/1987 | Elfline | |
| 4,708,853 A | 11/1987 | Matviya et al. | |
| 4,709,118 A | 11/1987 | Yan | |
| 4,752,397 A | 6/1988 | Sood | |
| 4,876,025 A * | 10/1989 | Roydhouse | 252/182.32 |
| 4,880,527 A | 11/1989 | Audeh | |
| 4,915,818 A * | 4/1990 | Yan | 208/251 R |
| 4,981,577 A | 1/1991 | Audeh et al. | |
| 5,107,060 A | 4/1992 | Yan | |
| 5,110,480 A | 5/1992 | Yan | |
| 5,173,286 A | 12/1992 | Audeh | |
| 5,202,301 A | 4/1993 | McNamara | |
| 5,226,545 A * | 7/1993 | Foust | 588/303 |
| 5,238,488 A | 8/1993 | Wilhelm | |
| 5,336,835 A | 8/1994 | McNamara | |
| 5,360,632 A | 11/1994 | Johnson et al. | |
| 5,908,557 A | 6/1999 | Smith et al. | |
| 6,077,421 A * | 6/2000 | Puranik et al. | 208/251 R |
| 6,117,333 A | 9/2000 | Frankiewicz et al. | |
| 6,197,269 B1 | 3/2001 | Jansen et al. | |
| 6,350,372 B1 | 2/2002 | Degnan et al. | |
| 6,403,044 B1 | 6/2002 | Litz et al. | |
| 6,475,451 B1 | 11/2002 | Leppin et al. | |
| 6,521,131 B1 | 2/2003 | Hamilton et al. | |
| 6,866,048 B2 | 3/2005 | Mattox | |
| 7,591,944 B2 | 9/2009 | Carnell et al. | |
| 7,666,318 B1 | 2/2010 | Lehtinen et al. | |
| 7,744,763 B2 | 6/2010 | Cross et al. | |
| 2003/0075484 A1 * | 4/2003 | Sakai et al. | 208/251 R |
| 2005/0263739 A1 | 12/2005 | Mattox et al. | |
| 2006/0048646 A1 | 3/2006 | Olson et al. | |
| 2006/0239877 A1 * | 10/2006 | Johnson et al. | 423/210 |
| 2007/0140940 A1 * | 6/2007 | Varma et al. | 423/215.5 |
| 2008/0283470 A1 | 11/2008 | Gustafsson et al. | |
| 2009/0114247 A1 | 5/2009 | Brown et al. | |
| 2009/0304563 A1 | 12/2009 | Harada et al. | |
| 2010/0000910 A1 | 1/2010 | Gallup et al. | |
| 2010/0025184 A1 | 2/2010 | Shibuya et al. | |
| 2010/0032344 A1 | 2/2010 | Cross et al. | |
| 2010/0032345 A1 | 2/2010 | Cross et al. | |
| 2010/0078358 A1 * | 4/2010 | Tullos et al. | 208/251 R |
| 2010/0099596 A1 | 4/2010 | Trahan | |
| 2010/0126909 A1 | 5/2010 | Bhasin et al. | |
| 2010/0155330 A1 | 6/2010 | Burba et al. | |
| 2010/0210889 A1 | 8/2010 | Hays et al. | |

FOREIGN PATENT DOCUMENTS

JP      10216476 A    8/1998

OTHER PUBLICATIONS

PCT International Search Report and Written Opinion, International Application No. PCT/US2011/061035, dated Jun. 29, 2012.
Pending U.S. Appl. No. 12/109,194, filed Apr. 24, 2008.
Pending U.S. Appl. No. 12/132,475, filed Jun. 3, 2008.
Pending U.S. Appl. No. 12/167,466, filed Jul. 3, 2008.

(Continued)

*Primary Examiner* — Randy Boyer
*Assistant Examiner* — Brandi M Doyle

(57) ABSTRACT

Trace element levels of heavy metals in crude oil are reduced by contacting the crude oil with an oxidizing agent, converting heavy metals into heavy metal cations for subsequent separation from the crude oil. At least a complexing agent is added to convert the heavy metal cations into soluble heavy metal complexes in a water phase, which can be separated from the crude oil, for a treated crude oil having reduced levels of heavy metals. In one embodiment, the complexing agent is selected from the group of metal halides, and the oxidizing agent is selected from the group of organic peracids, inorganic peracids and salts thereof.

18 Claims, No Drawings

(56) References Cited

OTHER PUBLICATIONS

Pending U.S. Appl. No. 12/883,578, filed Sep. 16, 2010.
Pending U.S. Appl. No. 12/883,921, filed Sep. 16, 2010.
Pending U.S. Appl. No. 12/883,971, filed Sep. 16, 2010.
Pending U.S. Appl. No. 12/883,995, filed Sep. 16, 2010.
Pending U.S. Appl. No. 12/950,060, filed Nov. 19, 2010.
Pending U.S. Appl. No. 12/950,170, filed Nov. 19, 2010.
Ashworth, S. C., "Mercury Removal at Idaho National Engineering and Environmentally Laboratory's New Waste Calciner Facility," *Waste Management*, Feb. 27-Mar. 2, 2000, INEEL, Bechtel BWXT Idaho, LLC, Tucson, AZ, pp. 1-20.
Campanella et al., "Mercury Removal from Petrochemical Wastes," *Water Research*, 1986, vol. 20, No. 1, pp. 63-65.
Carnell et al., "Mercury Matters," *Hydrocarbon Engineering*, Dec. 2005, 3 pages.
Chaiyasit et al., "Decontamination of Mercury Contaminated Steel (API 5L-X52) Using Iodine and Iodide Lixiviant," *Modern Applied Science*, Jan. 2010, vol. 4, No. 1, pp. 12-20.
Clever et al., "The Solubility of Mercury and Some Sparingly Soluble Mercury Salts in Water and Aqueous Electrolyte Solutions," *Journal of Physical and Chemical Reference Data*, 1895, vol. 14, No. 3, pp. 631-680.
Corvini et al., "Mercury Removal from Natural Gas and Liquid Streams," *UOP LLC*, 2002, Houston, TX, pp. 1-9.
Findlay et al., "Removal of Elemental Mercury from Wastewaters Using Polysulfides," *Environmental Science and Technology*, Nov. 1981, vol. 15, No. 11, pp. 1388-1390.
Gildert et al., "Mercury Removal from Liquid Hydrocarbons in Ethylene Plants," *AIChE Paper No. 135c*, Mar. 24, 2010, Spring National Meeting, San Antonio, TX, 14 pages.
Kim et al., "Demulsification of Water-In-Crude Oil Emulsions by a Continuous Electrostatic Dehydrator," *Separation Science and Technology*, 2002, vol. 37, No. 6, pp. 1307-1320.
Larson et al., "Mass-Transfer Model of Mercury Removal from Water via Microemulsion Liquid Membranes," *Industrial & Engineering Chemistry Research*, 1994, vol. 33, No. 6, pp. 1612-1619.
Lemos et al., "Demusification of Water-in-Crude Oil Emulsions Using Ionic Liquids and Microwave Irradiation," *Energy Fuels*, 2010, vol. 24, pp. 4439-4444.
Morel et al., "The Chemical Cycle and Bioaccumulation of Mercury," *Annual Review Ecology, Evolution, and Systematics*, 1998, vol. 29, pp. 543-566.
Núñez et al., "Leaching of Cinnabar with HCI-Thiourea Solutions as the Basis of a Process for Mercury Obtention," *Metallurgical Transactions B*, Sep. 1996, vol. 17B, pp. 443-448.
Sharma et al., "Chemical Demulsification of Natural Petroleum Emulsions of Assam (India)," *Colloid & Polymer Science*, 1982, vol. 260, pp. 616-622.
Sizeneva et al., "Applied Electrochemistry and Corrosion Protection of Metals: Mercury Passivation Solutions of Potassium Chloride and Sodium Hydroxide and Hypochlorite," *Russian Journal of Applied Chemistry*, 2009, vol. 82, No. 1, pp. 52-56.
Sizeneva et al., "Inorganic Synthesis and Industrial Chemistry: A Study of Mercury Dissolution in Aqueous Solutions of Sodium Hypochlorite," *Russian Journal of Applied Chemistry*, 2005, vol. 78, No. 4, pp. 546-548.
Venkatesan et al., "Removal of Complexed Mercury by Dithiocarbamate Grafted on Mesoporous Silica," *Journal of Radioanalytical and Nuclear Chemistry*, 2003, vol. 256, No. 2, pp. 213-218.
Waldo, John H., "Some New Water-Soluble Organo-Mercury Compounds," *Water Soluble Organo Compounds*, Mar. 6, 1931, vol. 53, pp. 992-996.
Wasay et al., "Remediation of a Soil Polluted by Mercury with Acidic Potassium Iodide," *Journal of Hazardous Materials*, 1995, vol. 44, pp. 93-102.
Yuan et al., "Fractions and Leaching Characteristics of Mercury in Coal," *Environmental Monitoring and Assessment*, Jan. 6, 2009, vol. 167, pp. 581-586.
Zhao et al., "Removal of Elemental Mercury by Sodium Chlorite Solution," *Chemical Engineering & Technology*, 2008, vol. 31, No. 3, pp. 350-354.

* cited by examiner

PROCESS, METHOD, AND SYSTEM FOR REMOVING HEAVY METALS FROM FLUIDS

CROSS-REFERENCE TO RELATED APPLICATIONS

None.

TECHNICAL FIELD

The invention relates generally to a process, method, and system for removing heavy metals such as mercury and the like from hydrocarbon fluids such as crude oil.

BACKGROUND

Heavy metals such as lead, zinc, mercury, silver, arsenic and the like can be present in trace amounts in all types of fuels such as crude oils. The amount can range from below the analytical detection limit (0.5 µg/kg) to several thousand ppb depending on the feed source. It is desirable to remove the trace elements of these metals from crude oils.

Various methods for removing trace metal contaminants in liquid hydrocarbon feed prior to fractional distillation have been developed. U.S. Pat. No. 4,474,896 claims the use of absorbent compositions, mainly polysulfide based, for removal of elemental mercury from gaseous and liquid hydrocarbon streams. Absorbent beds tend to get clogged by solid particulates in the crude, thus impeding the flow of the feed. Absorbents can also be very costly due to the large quantity needed.

U.S. Patent Application No. 2010/0078358 discloses the use of NaOCl as the oxidizing agent for converting at least a portion of Hg(0) to Hg(II). However, there is still a need to extract or convert the free mercury ions into a form that can be easily recovered and disposed. U.S. Patent Publication No. 2010/0051553 discloses the removal of mercury from liquid streams such as non-aqueous liquid hydrocarbonaceous streams upon contact with a Hg-complexing agent for mercury to form insoluble complexes for subsequent removal.

There is still a need for improved methods for extracting trace elements of heavy metals such as mercury and arsenic, wherein the heavy metals form soluble metal complexes for subsequent removal from the crude by water oil phase separation. There is still a need for improved methods for extracting soluble heavy metal complexes from the oil phase/interface phase into the water phase for subsequent removal.

SUMMARY OF THE INVENTION

In one aspect, the invention relates to an improved method to treat a crude oil to reduce its heavy metal concentration. In the method, a water stream consisting essentially of an oxidizing agent is added to the crude oil to extract at least a portion of the heavy metals into the water stream forming a waste stream. The improvement comprises adding a complexing agent to form soluble compounds in the water stream prior to separating the wastewater from the crude oil for a treated crude oil having a reduced heavy metal level.

In another aspect, the invention relates to a method for reducing a trace element of heavy metals, e.g., mercury, in a crude oil. The method comprises mixing into the crude oil an effective amount of an oxygen containing compound selected from the group of oxyhalites, hydroperoxides, and organic peroxides, inorganic peracids, organic peracids, and ozone to extract the heavy metals into a water-oil emulsion; adding an effective amount of a complexing agent to the water-oil emulsion to form soluble heavy metal complexes in the water phase; and separating the water containing the soluble heavy metal complexes from the crude oil for a treated crude oil having a reduced concentration of mercury.

DETAILED DESCRIPTION

The following terms will be used throughout the specification and will have the following meanings unless otherwise indicated.

"Crude oil" refers to a liquid hydrocarbonaceous material. Hydrocarbonaceous material refers to a pure compound or mixtures of compounds containing hydrogen and carbon and optionally sulfur, nitrogen, oxygen, and other elements. Examples include crudes, synthetic crudes, petroleum products such as gasoline, jet fuel, diesel fuel, lubricant base oil, solvents, and alcohols such as methanol and ethanol. In one embodiment, crude oil has a specific gravity of at least 0.75 at a temperature of 60° F. In another embodiment, the specific gravity is at least 0.85. In a third embodiment, the specific gravity is at least 0.90.

"Heavy metals" refer to gold, silver, mercury, osmium, ruthenium, uranium, cadmium, tin, lead, and arsenic. In one embodiment, heavy metals refer to mercury.

"Trace element" refers to the amount of heavy metals in the crude oil. The amount varies depending on the crude oil source and the type of heavy metal, for example, ranging from a few ppb to up to 30,000 ppb for mercury.

"Mercury sulfide" may be used interchangeably with HgS, referring to mercurous sulfide, mercuric sulfide, or mixtures thereof. Normally, mercury sulfide is present as mercuric sulfide with a stoichiometric equivalent of one mole of sulfide ion per mole of mercury ion.

"Mercury salt" or "mercury complex" meaning a chemical compound formed by replacing all or part of hydrogen ions of an acid with one or more mercury ions.

"Oil-water" or "oil-water emulsion" or "emulsion" or "emulsions" in the context of oil-water (or water-oil) emulsion refers to any mixture containing a crude oil with water, inclusive of both oil-in-water emulsions and water-in-oil emulsions. In one embodiment, emulsion includes locations within an oil-water mixture in which heavy metal concentrates, including interfaces and interface layers. In one embodiment, emulsion is present in the initial product of oil and produced water from the reservoir; in another embodiment, it is formed during the mixing of the crude oil with the oxidizing agent and/or the complexing agent. Emulsion can be stable or unstable, such as in dispersions of oil and water which can subsequently separate, as in the example of an oil water mixture left standing for 10 minutes at room temperature, at least a portion (e.g., 10 vol %.) will resolve into separate phases. In one embodiment, the oil-water emulsion particles are of droplet sizes. In another embodiment, the emulsion particles are of micron or nano particle sizes. In one embodiment of oil-water emulsion, oil is present as fine droplets contained in water in the form of an emulsion, e.g., emulsified hydrocarbons, or in the form of undissolved, yet non-emulsified hydrocarbons. In another embodiment, oil-water emulsion refers to a mixture which after mixing and allowed to stand undisturbed, a portion of the mixture is resolved into separate phases in 10 seconds. In yet another embodiment, less than 50% of the mixture is resolved in separate phases in 10 seconds.

"Interphase," or "interphase layer," or "interface layer," or "emulsion layer" may be used interchangeably, referring to the layer in between the oil and water phases, having characteristics and properties different from the oil and water phases. In one embodiment, the interface layer is a cloudy layer in between the water and oil phases. In another embodiment, the interface layer comprises a plurality of aggregates of coalescence (or droplets), with the aggregates being randomly dispersed in either the water phase or the oil phase.

"Complexing agent" or "chelating agent" refers to a compound that is capable of reacting with a heavy metal, e.g., mercury compounds.

"Oxidant" may be used interchangeably with "oxidizing agent," referring to compound that oxidizes heavy metals such as mercury to form mercury cations.

"Soluble" refers to materials that dissolve in water, in conjunction with heavy metal removal, meaning materials that are able to dissolve in water at concentrations comparable to the original concentration of the heavy metals in the crude oil (e.g., 1 ppb or greater).

"Halogens" refers to diatomic species from the column of the periodic table headed by fluorine, for example $F_2$, $Cl_2$, $Br_2$, $I_2$, and combinations thereof.

"Halogen oxides" refers to molecules which combine one or more halogen atoms and oxygen, for example $NaClO$, $ClO_2$, $NaClO_4$.

"Organic peracids" refers to multiple-carbon organic compounds phosphorous where the —OH in an acid group has been replaced with a —OOH group, e.g. a compound of the general formula RCO—OOH. Examples include but are not limited to peracetic acid, perbenzoic acid, meta-chloroperoxybenzoic acid and combinations thereof.

"Inorganic peracids" refers to compounds of sulfur, phosphorous, or carbon where the —OH in an acid group has been replaced with a —OOH group. Examples include but are not limited to peroxydiphosphoric acid, $H_4P_2O_8$ and peroxydisulfuric acid, $H_2S_2O_8$, sodium percarbonate $Na_2CO_3 \cdot 1.5H_2O_2$, sodium peroxydisulfate $Na_2S_2O_8$, potassium peroxydisulfate $K_2S_2O_8$, ammonium peroxydisulfate $(NH_4)_2S_2O_8$, and combination thereof.

Crudes and crude blends are used interchangeably and each is intended to include both a single crude and blends of crudes.

The invention effectively decreases the levels of heavy metals such as mercury, lead, arsenic, etc. from crude oil. In one embodiment, the crude oil is first brought into contact with an oxidant. In another embodiment, a complexing agent is added to the crude oil oxidant mixture to extract at least a portion of the oxidized heavy metal complexes from the interphase to the water phase. In another embodiment for the removal of mercury, the crude oil is brought into contact with a composition containing both the oxidizing agent and the complexing agent to form a soluble mercury compound. Mercury in the water phase is subsequently recovered.

Oxidizing Agent:

In one embodiment, the crude oil is brought into contact with an excess amount of oxidant under suitable conditions to oxidize at least a portion of the heavy metals to cations. An organic oxidizing agent or an oxidant in an aqueous form can be used. In one embodiment for the removal of arsenic, the oxidizing agent oxidizes reduced forms of arsenic to the 5+ oxidation state, e.g., arsine or other organic arsenic forms (soluble in hydrocarbons), arsenite (soluble in water), or arsenate (soluble in water). In an embodiment for the removal of mercury, the oxidant reacts with elemental Hg droplets, elemental Hg adsorbed on formation minerals, elemental Hg dissolved in the crude oil, as well as mercury compounds including but not limited to HgS, HgSe, HgO, converting at least a portion of elemental mercury) (Hg°) to cations, having an oxidation state equal to or greater than 1 (e.g., $Hg^{2+}$).

In one embodiment, an effective amount of oxidant means an amount employed to convert at least 75% of the elemental mercury to mercury cations. In another embodiment, an amount is used for a conversion of at least 95%. In a third embodiment, at least 99%. In a fourth embodiment, an amount for at least 50% of heavy metals to be extracted from the crude oil. In a fifth embodiment, an amount for at least 25% of heavy metal extraction from the crude oil. In yet another embodiment, the oxidant generates non-complexed ionic mercury ions from elemental mercury and complexed mercury. In one embodiment, the oxidant is selected from the group of halogens, oxides, peroxides and mixed oxides, including oxyhalites, their acids and salts thereof. In another embodiment, the oxidant is selected from the group of peroxides (including organic peroxides) such as hydrogen peroxide $H_2O_2$, sodium peroxide, urea peroxide, alkylperoxides, cumene hydroperoxide, t-butyl hydroperoxide, benzoyl peroxide, cyclohexanone peroxide, dicumyl peroxide. In yet another embodiment, the oxidant is selected from the group of inorganic peracids such as Caro's acid ($H_2SO_5$) or salts thereof, organic peracids, such as aliphatic $C_1$- to $C_4$-peracids and, optionally substituted, aromatic percarboxylic acids, peroxo salts, persulfates, peroxoborates, or sulphur peroxocompounds substituted by fluorine, such as $S_2O_6F_2$, and alkali metal peroxomonosulfate salts. Suitable oxygen-containing oxidizing agents also include other active oxygen-containing compounds, for example ozone.

In one embodiment, the oxidizing agent is selected from the group of sodium perborate, potassium perborate, sodium carbonate perhydrate, potassium peroxymonosulfate, sodium peroxocarbonate, sodium peroxodicarbonate, and mixtures thereof. In another embodiment, the oxidizing agent is hydrogen peroxide in the form of an aqueous solution containing 1% to 60% hydrogen peroxide (which can be subsequently diluted as needed). In another embodiment, the oxidizing agent is $H_2O_2$ in the form of a stable aqueous solution having a concentration of 16 to 50%. In a third embodiment, the oxidizing agent $H_2O_2$ is used as a solution of 1-3% concentration.

In one embodiment, the oxidant is selected from the group of elemental halogens or halogen containing compounds, e.g., chlorine, iodine, fluorine or bromine, alkali metal salts of halogens, e.g., halides, chlorine dioxide, etc. In yet another embodiment, the compound is an iodide of a heavy metal cation. In yet another embodiment, the oxidant is selected from ammonium iodide, an alkaline metal iodide, and etheylenediamine dihydroiodide. In one embodiment, the oxidant is selected from the group of hypochlorite ions (OCL such as NaOCl, $NaOCl_2$, $NaOCl_3$, $NaOCl_4$, $Ca(OCl)_2$, $NaClO_3$, $NaClO_2$, etc.), vanadium oxytrichloride, Fenton's reagent, hypobromite ions, chlorine dioxine, iodate $IO_3$ (such as potassium iodate $KIO_3$ and sodium iodate $NaIO_3$), and mixtures thereof. In one embodiment, the oxidant is selected from $KMnO_4$, $K_2S_2O_8$, $K_2CrO_7$, and $Cl_2$.

In one embodiment, the oxidant is selected from the group of monopersulfate, alkali salts of peroxide like calcium hydroxide, and peroxidases that are capable of oxidizing iodide.

The amount of oxidants used should be at least equal to the amount of heavy metal to be removed on a molar basis, if not in an excess amount. In one embodiment, an effective amount (or sufficient amount) of oxidants (and the water stream containing oxidants) is added for a molar ratio of oxidant to heavy metals ranging from 1.5:1 to 30,000:1. In another embodiment, a sufficient amount of water containing oxidants is provided for a molar ratio of oxidant to heavy metals ranging from 5:1 to 20,000:1. In a third embodiment, an effective amount means a molar ratio of oxidants to heavy metals ranging from 50:1 to 10,000:1. In a fourth embodiment, an effective amount means a molar ratio ranging from 100:1 to 5,000:1. In a fifth embodiment, the ratio ranges from 150:1 to 500:1. The contact can be carried out at room temperature or at an elevated temperature (e.g., from 30-80° C.) for a period of time, generally ranging from seconds to 1 day. In one embodiment, the contact is between 20 seconds to 5 hours. In another embodiment, from 1 minute to 1 hour. The volume ratio of water containing oxidants to crude oil in one embodiment ranges from 0.05:1 to 5:1. In a second embodiment, the volume ratio ranges from 1:1 to 2:1. In a third embodiment, from 0.1:1 to 1:1. In a third embodiment, the volume ratio is at least 0.5:1.

In one embodiment the oxidant selected is a hypochlorite, e.g., sodium hypochlorite, which is commercially produced in significant quantities. The hypochlorite solution in one embodiment is acidic with a pH value of less 4 for at least 80% removal of mercury. In another embodiment, the solution has a pH between 2 and 3. In a third embodiment, the sodium hypochlorite solution has a pH of less than 2. Low pH of less than 5 favors the decomposition to produce $OCl^-$ ions.

Complexing Agent:

Depending on the selection of the oxidizing agents, some easily transform insoluble heavy metals, e.g., $Hg^°$, to water soluble heavy metal cations, e.g., $Hg^{2+}$ for greater than 50% mercury removal with portions of the water-oil emulsion resolved into separate phases after a short period of time, e.g., less than 10 minutes. For some other oxidizing agents, the separation of the water and oil phases to remove the heavy metal cations happens with the use of separation devices, e.g., mechanical/rotating means such as a centrifuge or a hycrocyclone, for a long period of time, e.g., more than 10 minutes or 20 minutes, etc.

In one embodiment, the removal of heavy metals can be enhanced with the addition of a complexing agent to the oil-water emulsion mixture, thus alleviating the need for oil water separation device, e.g., mechanical separation/rotating means. Heavy metals such as arsenic, mercury, and the like form coordination complexes with compounds including but not limited to oxygen, sulfur, phosphorous and nitrogen containing compound. In treating the oil-water emulsion, the complexing agent forms strong complexes with the heavy metal cations, e.g., $Hg^{2+}$, extracting heavy metal complexes from the oil phase and/or the interface phase of the oil-water emulsion into the water phase by forming water soluble complexes. In one embodiment, the addition of a complexing agent essentially eliminates or reduces the volume of the oil-water emulsion layer, and replaces with separate oil and water layers. In one embodiment, the formation of a water layer containing heavy metal cations occurs within 15 minutes after the addition of the complexing agent. In a second embodiment, a separate water layer is formed after 10 minutes. In a third embodiment, the formation of a water layer containing soluble heavy metal cations occurs within 20 minutes of the addition of the oxidizing agent to the crude oil. In a fourth embodiment, the formation of a water layer occurs within 15 minutes of the addition of the oxidizing agent to the crude oil. In a fifth embodiment, the formation is within 5 minutes.

In one embodiment for the removal of mercury, a mercury-selective complexing agent has a large equilibrium binding constant for non-complexed mercury ions and is resistant to oxidation by the oxidizing agent added to the oil-water emulsion layer (if it can be isolated), or the crude oil/oxidizing agent mixture. In one embodiment, the addition of the complexing agent allows at least 50% of the mercury cations to react with the complexing agent, forming a water soluble mercury compound, e.g., mercury complexes, when it comes into contact with the mercury cations. In another embodiment, at least 75% of the mercury cations in the oil phase and/or interface phase are converted into water soluble complexes. In a third embodiment, at least 90% conversion. In a fourth embodiment, at least 95% of the mercury cations are converted/extracted from the oil phase and/or interface phase into the water phase as water soluble compounds. In yet another embodiment with the selection of a complexing agent which also functions as a reducing agent, it neutralizes excess oxidant that could make the crude oil corrosive.

Examples of mercury-selective chelating groups include thiol groups, dithiocarbamic acid, thiocarbamic acid, thiocarbazone, cryptate, thiophene groups, thioether groups, thiazole groups, thalocyanine groups, thiourenium groups, amino groups, polyethylene imine groups, hydrazido groups, N-thiocarbamoyl-polyalkylene polyamino groups, derivatives thereof, and mixtures thereof.

Examples of complexing agents as reducing agents include but are not limited to hydrazines, sodium metabisulfite ($Na_2S_2O_5$), sodium thiosulfate ($Na_2S_2O_3$) and thiourea.

In one embodiment, the complexing agent is an inorganic sulfur compound selected from the group of sulfides, ammonium thiosulfate, alkali metal thiosulfates, alkaline earth metal thiosulfates, iron thiosulfates, alkali metal dithionites, and alkaline earth metal dithionites, and mixtures thereof. Examples of sulfides include but are not limited to potassium sulfide, alkaline earth metal sulfides, sulfides of transition elements number 25-30, aluminum sulfides, cadmium sulfides, antimony sulfides, Group IV sulfides, and mixtures thereof.

In another embodiment, the inorganic sulfur compounds are oxygen-containing compounds such as thiosulfates and dithionites. Examples include alkali metal thiosulfates, alkaline earth metal thiosulfates, iron thiosulfates, alkali metal dithionites, and alkaline earth metal dithionites and mixtures thereof can be employed to insolubilize soluble mercury. Suitable alkali metal thiosulfates include ammonium thiosulfate, sodium thiosulfate, potassium thiosulfate, and lithium thiosulfate. Examples of alkaline earth metal thiosulfates include calcium thiosulfate and magnesium thiosulfate. Ferric thiosulfate exemplifies an iron thiosulfate which may be employed. Alkali metal dithionites include sodium dithionite and potassium dithionite. Calcium dithionite is suitable as an alkaline earth metal dithionite complexing agent.

In another embodiment, the complexing agent is a polyamine for forming stable cationic complexes with the ions of heavy metals. Exemplary polyamines include ethylenediamine, propylenediamine, triaminotriethylamine, diethylenetriamine, triethylenetetramine (TRIEN), tetraethylenepentamine and tetra-2-aminoethylethlenediamine. In one embodiment, the polyamine may include carboxyl groups, hydroxyl groups and/or other substituents, as long as they do not weaken the complex forming effect of the polyamine. In one embodiment, the complexing agent is tetraethylenepentamine (TETREN), which forms a stable complex with mercury at a pH around 4.

In one embodiment, the complexing agent is selected from the group of DEDCA (diethyl dithiocarbanic acid) in a concentration of 0.1 to 0.5M, DMPS (sodium 2,3-dimercaptopropane-1-sulfonate), DMSA (meso-2,3-dimercaptosuccinic acid), BAL (2,3-dimercapto-propanol), CDTA (1,2-cyclohexylene-dinitrilo-tetraacetic acid), DTPA (diethylene triamine pentaacetic acid), NAC (N-acetyl L-cystiene), sodium 4,5-dihydroxybenzene-1,3-disulfonate, polyaspartates; hydroxyaminocarboxylic acid (HACA); hydroxyethyliminodiacetic (HEIDA); iminodisuccinic acid (IDS); nitrilotriacetic acid (NTA), aminopolycarboxylic acids (such as ethylenediaminetetraacetic acid or EDTA), amino carboxylic acids (ethylenediaminotetraacetate, diethylenetriaminopentaacetate, nitriloacetate, hydroxyethylethylenediaminotriacetate), oxycarboxylic acids (citrate, tartrate, gluconate), and other carboxylic acids and their salt forms, phosphonates, acrylates, and acrylamides, and mixtures thereof.

In yet another embodiment, the complexing agent is a metal halide, for example, halides selected from the group Li, Na, K, Ca, Fe, Ni, Zn and combinations thereof. An example of a complexing agent is KI, which combines with mercuric iodide to form a water soluble compound having the formula $K_2HgI_4$. In another embodiment, the complexing agent is selected from nickel and ferric ions, e.g., from a salt such as $FeCl_3$ or $NiCl_2$, for forming compounds encompassing the heavy metal ions, e.g., ferric arsenate and ferric hydroxide.

The complexing agents are employed in a sufficient amount to effectively stabilize (forming complexes with) the soluble heavy metals in the oil-water mixture. In one embodiment, the sufficient amount is expressed as molar ratio of complexing agent to soluble mercury in the ranges of 1:1 to 5,000:1. In a second embodiment from 2:1 to about 3,000:1. In a third embodiment from 5:1 to about 1,000:1. In a fourth embodiment, from 20:1 to 500:1.

In one embodiment with the use of inorganic sulfur compounds as complexing agents, stabilizing amounts of the complexing agent employed are related, for example, to the solubility of the inorganic sulfur compounds in water. For example, stabilizing agents which are relatively soluble in water include alkali metal sulfides, nitrogen sulfides, alkali metal thiosulfates, ammonium thiosulfate, alkaline earth metal thiosulfates, iron thiosulfate, and alkali metal dithionites. Stabilizing amounts employed for less soluble inorganic sulfur compounds such as alkaline earth metal sulfides, transition metal sulfides of elements 25 to 30, and Group IV sulfides can include molar ratios of the inorganic sulfur compound to heavy metals in the crude oil from about 5:1 to about 1,000:1.

In one embodiment for the removal of heavy metals such as arsenic and/or mercury, an acidic complexing agent is employed with the addition of an acid such as HCl, for the composition to have a pH of 6 or less in one embodiment, 5 or less in a second embodiment, and 3 or less in a third embodiment. In one example with the use of KI as the complexing agent, a solution mixture of KI and HCl having a pH in the range of 1.5 to 3 is employed. In another embodiment, a solution mixture of KBr and HCl having a pH of less than 4 is used. In a third embodiment, an HCl-thiourea solution mixture is used, with the acid concentration of less than 5M and thioureas concentration from 0.3 to 1.4M.

Optional Reagent Treatments:

In one embodiment, at least a demulsifier is added to the mixture to further chemically separate the crude oil and the water containing the heavy metal compounds. In one embodiment, at least a demulsifier is added at a concentration from 100 to 5,000 ppm. In another embodiment, a demulsifier is added at a concentration from 100 to 1,500 ppm. In a third embodiment, the demulsifier is added along with pH adjustment with caustic or acid. In addition to the demulsifier treatments, surfactants are sometimes required for resolution of solids, viscous oil-water interfaces and sludging if any.

In one embodiment, the demulsifier is a commercially available demulsifier selected from polyamines, polyamidoamines, polyimines, condensates of o-toluidine and formaldehyde, quaternary ammonium compounds and ionic surfactants. In another embodiment, the demulsifier is selected from the group of polyoxyethylene alkyl phenols, their sulphonates and sodium sulphonates thereof. In another embodiment, the demulsifier is a polynuclear, aromatic sulfonic acid additive.

Method for Removing/Decreasing Levels of Heavy Metals in Crude Oil:

The trace element removal rate depends on the type of heavy metal to be removed, the oxidant and complexing reagents employed, and in one embodiment, the pH of the reagents. In one embodiment, an oxidant is first prepared or obtained. The oxidant is brought in contact with the crude oil containing heavy metals by means known in the art. In the next step, at least a complexing agent is added to the crude oil-oxidant mixture, forming soluble metal complexes, thus extracting the heavy metal complexes into the aqueous phase.

Depending on the selected oxidant and/or the subsequent complexing reagent to be used, the pH of the solution can first be adjusted or maintained by the use of a buffer to improve the removal rate. Exemplary buffers, such as phosphate and citrate, are serviceable for a prescribed pH range. The pH can be adjusted to the alkaline range using ammonium hydroxide, ammonium chloride, ammonium citrate, ammonium lactate, potassium hydroxide, potassium formate, sodium hydroxide, sodium acetate, and mixtures thereof. Additionally, nitriloacetic acids can be used as buffers. The pH can be adjusted to the acidic range using acids such as HCl. Other exemplary acids include nitrilotriacetic acid (NTA) and ethylenediamine-N,N,N',N'-tetraacetic acid (EDTA). In one embodiment, the pH of the solution is maintained in a neutral range of 6-8. In another embodiment, the pH of the solution is kept acidic at a pH of less than 3.

The contact between the crude oil and the reagents can be at any temperature that is sufficiently high enough for the crude oil to be completely liquid. In one embodiment, the contact is at room temperature. In another embodiment, the contact is at a sufficiently elevated temperature, e.g., at least 50° C. In one embodiment, the process is carried out about 20° C. to 65° C. Higher temperatures favor removal of heavy metals in crude oil.

The contact time between the reagents and the crude oil is for a sufficient amount of time for a portion of the heavy metals to be extracted from the crude oil into the water-oil emulsion, and subsequently into the water phase. In one embodiment, the contact time is sufficient for at least 50% of the heavy metals to be extracted from the crude oil into the water phase. In a third embodiment, at least 75% extraction. In a fourth embodiment, at least 90% extraction. The sufficient amount of time is dependent on the mixing of the crude oil with the reagents. If vigorous mixing is provided, the contact time can be as little as 20 seconds. In one embodiment, the contact time is at least 5 minutes. In another embodiment, the contact time is at least 30 minutes. In a third embodiment, at least 1 hr. In a fourth embodiment, the contact is continuous for at least 2 hrs.

The oxidant and complexing reagents can be introduced continuously, e.g., in a water stream being brought into contact continuously with a crude oil stream, or intermittently, e.g., injection of a water stream batch-wise into operating gas or fluid pipelines. Alternatively, batch introduction is effective for offline pipelines.

In one embodiment instead of separate or sequential feeding steps, the oxidant and complexing reagents are added to the crude oil in one single step, as separate compositions or as a single composition, for the oxidation of elemental dissolved heavy metals to be immediately followed by or almost simultaneously with the extraction of the oxidized heavy metals, e.g, $Hg^{2+}$, into the water phase.

In one embodiment, the reagents are injected into the crude oil/water stream to form highly soluble mercury complexes in the water phase, and away from the crude oil. In one embodiment, the complexing agent can also be used as tracers in the injection water to monitor water flood sweep efficiency or produced water returns in producing well.

After the heavy metal complexes are extracted into the water phase, the water containing the complexes is separated from the crude oil in a phase separation device known in the art, resulting in a crude oil with a significantly reduced level of heavy metals. The soluble heavy metal complexes can be isolated/extracted out of the effluent and subsequently disposed. In one embodiment, the water phase after separation can be injected back into the reservoir for water flooring, or reservoir water support as a mean of disposing the mercury that was originally in the crude oil. In one embodiment, the water phase is disposed into or injected back to the reservoir which produced the crude oil.

In one embodiment, instead of or in addition to the addition of at least a complexing agent, other means are employed to enhance the resolution of the water-oil emulsions, including but not limited to heating the crude oil mixture (to over 50° F., and up to 185° F.), further mixing time, further quiescent time (8 to 24 hours), pH adjustment of the oil-water emulsion, or the addition of at least a demulsifier. In another embodiment, a continuous electrostatic dehydrator is used to help with the water/oil separation. In yet another embodiment, resolution of the water-oil emulsions is enhanced with the aid of ionic liquids and/or microwave treatment.

After the oil/water separation, in one embodiment the heavy metal complexes are removed from water through the use of a selective adsorbent material, e.g., a porous resin having mercury selective chelating groups bound thereto. In another embodiment, the heavy metal complexes are subsequently removed through techniques such as filtration, coagulation, flotation, co-precipitation, ion exchange, reverse osmosis, ultra-filtration using membranes and other treatment processes known in the art.

Depending on the source, the crude oil feed can have an initial heavy metal level such as mercury of at least 50 ppb. In one embodiment, the initial level is at least 5,000 ppb. Some crude oil feed may contain from about 2,000 to about 100,000 ppb of heavy metals such as mercury. In one embodiment with the trace element removal or reduction of heavy metals including mercury, the heavy metal level in the crude oil is reduced to 100 ppb or less. In another embodiment, the level is brought down to 50 ppb or less. In a third embodiment, the level is 20 ppb or less. In a fourth embodiment, the level is 10 ppb or less. In a fifth embodiment, the level is 5 ppb or less. In yet another embodiment, the removal or reduction is at least 50% from the original level of heavy metals such as mercury or arsenic. In a fifth embodiment, at least 75% of a heavy metal is removed. In a seventh embodiment, the removal or the reduction is at least 90%.

Heavy metal levels, e.g., mercury, can be measured by conventional techniques known in the art, including but not limited to cold vapor atomic absorption spectroscopy (CV-AAS), cold vapor atomic fluorescence spectroscopy (CV-AFS), Gas Chromatography Combined with Inductively Coupled Plasma Mass Spectrometry (or GC-ICP-MS with 0.1 ppb detection limit), Combustion Amalgamation, etc.

EXAMPLES

The following examples are given to illustrate the present invention. It should be understood, however, that the invention is not to be limited to the specific conditions or details described in these examples. In examples calling for mercury vapor feed, a sufficient amount of mercury (e.g., one or two drops of elemental mercury in a bottle) was sparged by using nitrogen ($N_2$) gas into another bottle containing white mineral oil overnight. The ppm and ppb concentrations in the tables are by weight. % Hg removal indicates the removal as a percent of amount of Hg initially present.

Examples 1-11

A series of experiments are carried out, each for a different oxidant. Example 1 is a control experiment without any oxidant being used (complexing agent TETREN only at a final concentration of 30 µM). For each of experiments 2-11, 5 mL of mercury vapor feed was placed into a 10 mL Teflon-capped centrifuge tube. Oxidant was added to make a final concentration as shown in Table 1. The tube was shaken vigorously for about 2 minutes. 5 mL of distilled water was added to tube. A pre-determined volume of TETREN was added for a final concentration of 30 µM. Tube was again shaken by hand vigorously for about 2 minutes, then centrifuged for 1 minute to separate oil from water. Aliquots of the oil and water were measured for Hg using Lumex Hg analyzer equipped with Pyro-915+. Results of the experiments are shown in Table 1.

TABLE 1

| No. | Oxidant | Dosage ppm | Hg in oil ppb | Hg in water ppb | Hg removal % |
|---|---|---|---|---|---|
| 1 | None—control | — | 1027 ± 41 | 39 | 3.7 |
| 2 | Iodine | 1000 | 25 ± 15 | 944 | 98 |
| 3 | Sodium polysulfide | 29,000 | 58 ± 8 | 1000 | 94 |
| 4 | Sodium polysulfide | 2,900 | 884 ± 19 | 234 | 13.9 |
| 5 | Na persulfate $Na_2S_2O_8$ | 940 | 540 ± 15 | 580 | 47.4 |
| 6 | Dimethylsulfoxide | 310 | 1050 ± 0 | 58 | 0 |
| 7 | Na perborate, $NaBO_3$ | 610 | 978 ± 123 | — | 4.8 |
| 8 | Na percarbonate, $Na_2CO_3 \cdot 1.5H_2O_2$ | 620 | 1065 ± 14 | 74 | 0 |
| 9 | Na periodate, $NaIO_4$ | 840 | 980 ± 15 | 116 | 4.6 |
| 10 | 2-Iodobenzoic acid | 980 | 892 ± 103 | 92 | 13.1 |
| 11 | 2-Iodobenzoic acid | 1960 | 449 ± 111 | 780 | 56.3 |

Examples 12-14

The same procedures in Examples 1-11 are repeated, but with Oxone™ ($2KHSO_5 \cdot KHSO_4 \cdot K_2SO_4$) as the oxidant at different dosage level, and with different complexing agents (or none) as indicated in Table 2. The results are listed in Table 2.

TABLE 2

| No. | Oxidant/ Complexing Agent | Dosage ppm | Hg in oil ppb | Hg in water ppb | Hg removal % |
|---|---|---|---|---|---|
| 12 | Oxone ™/None | 2420 | 305 ± 21 | 800 | 70.3 |
| 13 | Oxone ™/None | 2420 | 246 ± 3 | 877 | 76.0 |
| 14 | Oxone ™/TETREN | 7260 | 127 ± 8 | 829 | 87.6 |

Examples 15-25

The same procedures were repeated but with different oxidants at different concentrations as shown in the table, and with TETREN as the complexing agent added for a final concentration at 1,500 ppm. Results are shown in Table 3:

TABLE 3

| No. | Oxidant | Dosage ppm | Hg in oil ppb | Hg in water ppb | Hg removal % |
|---|---|---|---|---|---|
| 15 | None—control | | 1150 | — | 5.7 |
| 16 | Iodine | 50 | 114 | 955 | 90.1 |
| 17 | $KBrO_3$ | 540 | 972 ± 83 | 196 | 15.5 |
| 18 | $KIO_3$ | 690 | 1083 ± 25 | 112 | 5.8 |
| 19 | $NaClO_3$ | 340 | 974 ± 33 | 166 | 15.3 |
| 20 | $NaClO_2$ | 290 | 1107 ± 23 | 44 | 3.7 |
| 21 | $Fe_2(SO_4)_3$ | 1290 | 1111 ± 10 | 36 | 3.4 |
| 22 | $FeCl_3$ | 1060 | 906 ± 24 | 179 | 21.2 |
| 23 | $CuSO_4$ | 520 | 1160 ± 140 | 41 | 0 |
| 24 | $KMnO_4$ | 510 | 49 ± 5 | 1120 | 96 |
| 25 | $HNO_3$ | 200 | 1142 ± 103 | 21 | 0.1 |

Examples 26-50

The same procedures in Examples 2-11 are repeated, but with different oxidants at different dosage levels, as well as different complexing agents at different final concentrations. Results are as indicated in Table 4.

TABLE 4

| No. | Oxidant | dosage ppm in oil | Complexing agent ppm in water | Hg in oil ppb | Hg removal % |
|---|---|---|---|---|---|
| 26 | None—control | | Tetren/1500 | 1150 | 5.7 |
| 27 | Iodine | 50 | NONE | 1060 | 7.8 |
| 28 | benzoyl peroxide | 50 | NONE | 1190 | — |
| 29 | benzoyl peroxide | 50 | Na thiosulfate/124 | 1020 | 11.3 |
| 30 | benzoyl peroxide | 50 | Na thiosulfate/248 | 931 | 19.0 |
| 31 | benzoyl peroxide | 50 | Na thiosulfate/496 | 922 | 19.8 |
| 32 | benzoyl peroxide | 100 | Tetren/500 | 1200 | 0 |
| 33 | benzoyl peroxide | 100 | Tetren/1500 | 1130 | 1.7 |
| 34 | benzoyl peroxide | 100 | KI/5000 | 679 | 41.0 |
| 35 | benzoyl peroxide | 800 | KI/2000 | 213 | 81.5 |
| 36 | benzoyl peroxide | 800 | KI/4000 | 29 | 97.5 |
| 37 | benzoyl peroxide | 200 | KI/5000 | 600 | 47.8 |
| 38 | benzoyl peroxide | 300 | KI/5000 | 454 | 60.5 |
| 39 | benzoyl peroxide | 400 | KI/5000 | 354 | 69.2 |
| 40 | benzoyl peroxide | 500 | KI/5000 | 214 | 81.4 |
| 42 | benzoyl peroxide | 600 | KI/5000 | 142 | 87.7 |
| 42 | benzoyl peroxide | 700 | KI/5000 | 62 | 94.6 |
| 43 | t-butyl hydroperoxide | 25 | KI/5000 | 410 | 64.3 |
| 44 | t-butyl hydroperoxide | 50 | KI/5000 | 88 ± 6 | 92.3 |
| 45 | t-butyl hydroperoxide | 100 | KI/5000 | 79 | 93.1 |
| 46 | t-butyl hydroperoxide | 200 | KI/5000 | 40 | 96.5 |
| 47 | t-butyl hydroperoxide | 250 | KI/5000 | 45 | 96.1 |
| 48 | Hydrogen peroxide | 25 | KI/5000 | 77 | 93.3 |
| 49 | Hydrogen peroxide | 50 | KI/5000 | 32 | 97.2 |
| 50 | Hydrogen peroxide | 75 | KI/5000 | 15 | 98.7 |

Examples 51-53

50 mL of mercury vapor feed preparation containing approximately 1,100 ppb Hg was added to a number of 100 mL glass tubes, then mercury level was measured using LUMEX mercury analyzer equipped with PYRO-915+. 50 mL of distilled water was placed in the tubes, and the mercury level was measured using LUMEX mercury analyzer equipped with PYRO-915+. A pre-determined volume of 3 different oxidants (hydrogen peroxide ($H_2O_2$), t-butyl hydroperoxide, and cumene hydroperoxide) was added to each reactor for a final oxidant concentration of 50 ppm. The oil-water mixture was stirred up for 1 minute. In the next step, different complexing reagents (potassium iodide (KI), sodium thiosulfate ($Na_2S_2O_3$), TETREN, and $Na_4EDTA$) were added to each reactor to make a final concentration of: 50, 500 and 5,000 ppm KI; 470 and 4,700 ppm $Na_2S_2O_3$; 570 and 5,700 ppm TETREN; 1,200 and 12,000 ppm $Na_4EDTA$. The tubes were shaken vigorously for 1 minute. Aliquots of both oil and water from each were analyzed for mercury. Results are presented in Table 5 showing mercury removal rate for each combination of oxidants and reagents.

TABLE 5

| No. | Oxidant | KI (in ppm) | | | $Na_2S_2O_3$ | | Tetren | | EDTA | |
|---|---|---|---|---|---|---|---|---|---|---|
| | | 5,000 | 500 | 50 | 4,700 | 470 | 5,700 | 570 | 1,200 | 12,000 |
| 51 | 50 ppm $H_2O_2$ | 99% | 88% | 30% | — | 24% | 17% | 19% | na | 2% |
| 52 | 50 ppm tBHP* | 40% | 11% | — | 10% | — | 16% | 14% | 15% | 12% |
| 53 | 50 ppm CHP** | 35% | — | — | 16% | — | — | — | — | — |

*tBHP: t-butyl hydroperoxide
**CHP: cumene hydroperoxide

Example 54

50 mL of mercury vapor feed preparation (i.e., mineral oil) containing approximately 1,100 ppb Hg is added to a number of 100 mL glass tubes, then mercury level is measured using LUMEX mercury analyzer equipped with PYRO-915+. Four different samples of pre-determined volume of 5 mmol/L sodium chlorite at different pH (3, 6, 9, and 11) is added to each tube for a final oxidant concentration of 50 ppm. The pH of the sodium chlorite solution is adjusted by the addition of HCl. The mixture is stirred up for at least 10 minutes. It is expected that high pH values weakens the rate of $Hg°$ oxidation, e.g., from greater than 80% mercury removal at a pH of 3 to less than 10% at a pH of 11.

Example 55

50 mL of crude oil containing approximately 1,000 ppb Hg was added to a 100 mL glass tube, then mercury level was measured using LUMEX mercury analyzer equipped with PYRO-915+. A pre-determined volume of 5 wt. % sodium hypochlorite solution was added to the glass tube for a final oxidant concentration of 50 ppm. The mixture was stirred up for at least 10 minutes. A cloudy oil-water emulsion was formed in the test tube, indicating that oxidation took place but it would be difficult to separate the emulsion from the crude oil.

Example 56

50 mL of crude oil containing approximately 1,000 ppb Hg is added to a 100 mL glass tube, then mercury level is measured using LUMEX mercury analyzer equipped with PYRO-915+. A pre-determined volume of 5 wt. % aqueous solution of $FeCl_2$ is added to the glass tube for a final concentration of 50 ppm. It expected that oxidation is to take place, but the mercury cations will remain trapped in a cloudy oil-water emulsion and that it will be difficult to separate the emulsion layer from the crude oil.

Example 57

Example 56 is repeated, except that a complexing agent, e.g., KI solution at different pH (7, 5, and 3) is added to the oil-water emulsion, and the mixture is stirred up for at least 10 minutes. It is expected that the acidic KI enhances the mercury removal with the formation of soluble mercury compounds which minimizes the volume of the emulsion, resulting in separate water/crude oil layers with reduced mercury level of at least 50% in the treated crude oil, or for at least 50% of the mercuric compounds to be removed from the emulsion into the water phase. It is expected that an acidic pH of 3 or less allows at least 80% of the mercuric compounds from the interface layer into the water layer.

Example 58

50 mL of mercury vapor feed preparation containing approximately 1,100 ppb Hg is added to a number of 100 mL glass tubes, then mercury level is measured using LUMEX mercury analyzer equipped with PYRO-915+. A pre-determined volume of hydrogen peroxide ($H_2O_2$) is added to each tube for a final oxidant concentration of 50 ppm. The oil-water mixture is stirred up for 1 minute. Thiourea is added to 200 $cm^3$ of HCl 2M to produce a concentration of 110 g/l. The mixture is added to the glass tube and stirred up for at least 60 minutes. Mercury extraction into the water phase is expected to be as comparable to using KI as a complexing agent, of up to 99%, with the advantage that thioureas as a complexing agent is more economical than KI.

Example 59

To four glass bottles, the following is added: 1) a control sample of 40 g crude oil containing approximately 20,000 ppb Hg, 2) 40 g crude oil and 40 g deionized water, 3) 40 g crude oil and 40 g of 5.6-6.0% sodium hypochlorite (bleach) solution; 4) 40 g crude oil and 40 g of 5.6-6.0% sodium hypochlorite (bleach) solution. The samples are shaken for 2 minutes, forming oil-water emulsion in samples 2-4. Samples 1-3 are centrifuged at 90° C. and 3500 RPM for 20 minutes, effecting a water-oil separation. Sample 4 is not centrifuged and left as is—still showing oil-water emulsion even after 20 minutes.

The oil and water phases from the samples 1-3 are analyzed for mercury. It is expected that samples 1-2 show no mercury removal with the mercury still remaining in the crude oil. Sample 3 (using centrifuge to facilitate oil water separation) is expected to show a mercury removal rate of at least 70%. Sample 4 cannot be easily analyzed due to the oil-water emulsion.

Example 60

Sample 4 with oil-water emulsion is stirred up for 1 minute. Potassium iodide (KI) is added to the sample for a final concentration of 5,000 ppm KI. The glass bottle is shaken vigorously for 1 minute. Aliquots of both oil and water from each are analyzed for mercury. The sample is expected to show a mercury removal rate of at least 70% (as with sample 3), and without the need for centrifuge For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for reducing a trace element of mercury in a crude oil, comprising:
   mixing into the crude oil a water phase and an effective amount of at least an oxidizing agent selected from the group of oxyhalites, hydroperoxides, organic peroxides, inorganic peracids and salts thereof, organic peracids and salts thereof, ozone and combinations thereof to extract at least a portion of the mercury into a water-oil emulsion as water soluble mercury cations;
   adding an effective amount of a complexing agent to convert the extracted mercury cations to water soluble mercury compounds in a water phase; and
   separating the water phase containing the water soluble mercury compounds from the crude oil for a treated crude oil having a reduced concentration of mercury by water oil phase separation;
   wherein the complexing agent is selected from the group of ethylenediamine, propylenediamine, triaminotriethylamine, diethylenetriamine, triethylenetetramine (TRIEN), tetra-2-aminoethylethlenediamine, tetraethylenepentamine (TETREN), ammonium thiosulfate, alkali metal thiosulfates, alkaline earth metal thiosulfates, iron thiosulfates, alkali metal dithionites, and alkaline earth metal dithionites, and mixtures thereof.

2. The method of claim 1, for treating a crude oil having a specific gravity of at least 0.75 at 60° F.

3. The method of claim 1, wherein the oxidizing agent is selected from the group of sodium perborate, potassium perborate, sodium carbonate perhydrate, potassium peroxymonosulfate, sodium peroxocarbonate, sodium peroxodicarbonate, and mixtures thereof.

4. The method of claim 1, wherein the oxidizing agent is an oxyhalite.

5. The method of claim 1, wherein the oxidizing agent is NaOCl.

6. The method of claim 1, wherein the oxidizing agent is ferrous halide.

7. The method of claim 1, wherein the oxidizing agent is $FeCl_2$.

8. The method of claim 1, wherein the complexing agent is added either before, simultaneously with, or after the oxidizing agent is mixed into the crude oil.

9. The method of claim 1, wherein the complexing agent is added after the addition of the oxidizing agent to the crude oil.

10. The method of claim 1, wherein the complexing agent converts at least 50 mole % of the extracted mercury to soluble mercury compounds.

11. The method of claim 10, wherein the addition of the complexing agent converts at least 80 mole % of the extracted mercury to soluble mercury compounds.

12. The method of claim 1, wherein the water soluble mercury compounds in a water phase is formed within 20 minutes of mixing the oxidizing agent into the crude oil.

13. The method of claim 1, wherein the treated crude oil contains less than 50 ppb mercury.

14. The method of claim 1, wherein the separation of the water phase containing soluble mercury compounds from the crude oil for a treated crude oil having a reduced concentration of mercury is without using mechanical or rotating means.

15. The method of claim 1, wherein the water soluble mercury compounds are formed in the water phase within 10 minutes after the complexing agent is added.

16. The method of claim 1, wherein at least 50% of the mercury compounds are extracted and converted forming water soluble mercury complexes in the water phase.

17. A method for reducing a trace element of mercury in a crude oil, comprising:
   adding to the crude oil a water stream containing an oxidizing agent to extract at least a portion of the mercury into a water-oil emulsion as water soluble mercury cations;
   adding an effective amount of a complexing agent to convert the extracted mercury cations to form water soluble mercury compounds in a water phase; and
   separating the water phase containing the water soluble mercury compounds from the crude oil by water oil phase separation for a treated crude oil having a reduced concentration of mercury,
   wherein the complexing agent is selected from the group of ethylenediamine, propylenediamine, triaminotriethylamine, diethylenetriamine, triethylenetetramine (TRIEN), tetra-2-aminoethylethlenediamine, tetraethylenepentamine (TETREN), ammonium thiosulfate, alkali metal thiosulfates, alkaline earth metal thiosulfates, iron thiosulfates, alkali metal dithionites, and alkaline earth metal dithionites, and mixtures thereof.

18. The method of claim 17, wherein the oxidizing agent is selected from the group of sodium perborate, potassium perborate, sodium carbonate perhydrate, potassium peroxymonosulfate, sodium peroxocarbonate, sodium peroxodicarbonate, and mixtures thereof.

* * * * *